March 25, 1958 P. SADLER 2,827,923
MAGNETICALLY OPERATED VALVES
Filed Aug. 30, 1954 2 Sheets-Sheet 1

Inventor
Peter Sadler
By
Attorneys

March 25, 1958 P. SADLER 2,827,923
MAGNETICALLY OPERATED VALVES
Filed Aug. 30, 1954 2 Sheets-Sheet 2

Inventor
Peter Sadler
By
Attorneys 2,827,923
Patented Mar. 25, 1958

2,827,923
MAGNETICALLY OPERATED VALVES

Peter Sadler, Pendleton, Salford, England, assignor to N. G. N. Electrical Limited, Patricroft, England, a company of Great Britain Application August 30, 1954, Serial No. 452,971

1 Claim. (Cl. 137—589)

This invention relates to improvements in solenoid operated valves and more particularly to such valves for use in apparatus employing a high degree of vacuum.

Magnetically controlled isolation valves have been employed in high vacuum systems down to $10^{-7}$ mm. but difficulty has been experienced in the operation of such valves by a solenoid due to the small lift obtainable and the object of the present invention is to increase the lift of the valve without undue increase in the size of the operating coil.

In high vacuum systems it is usual to employ two or more stages of pressure reduction, the first stage reducing the pressure to a predetermined value and the second stage reducing it still further. Isolation valves must be provided to isolate the second stage during the insertion and removal of apparatus from a high vacuum chamber.

According to the invention a solenoid operated valve is loaded by a spring on to a bolt carried by the solenoid armature and normally maintained on its seating by a further spring and being kept thereon by the vacuum in the pipe line beneath the seating until positively lifted therefrom by the bolt head, energisation of the solenoid initially causing the spring to be compressed whilst the valve remains on its seat until the head of the bolt gives a positive lift to the valve whereupon the valve opens quickly to provide a full bore through the pipe line.

The invention will be described with reference to the accompanying drawings.

The valve unit comprises a solenoid coil A surrounded by a ferrous cylinder B closed top and bottom. The coil is supported on a non ferrous sleeve C applied at its upper and lower ends to ferrous caps $C^1$; a ferrous plug or pole $C^2$ projects from the top of the cylinder B into the upper end of the sleeve C and is secured to the cylinder B by a nut $C^4$ outside the cylinder. A disc $C^3$ of insulating material having a central aperture is arranged to rest on a shoulder on the pole $C^2$, terminals $e$ and control switches (not shown) being mounted on the disc.

A junction D of non ferrous metal is affixed centrally of the base of the cylinder one arm $d$ of the junction being in line with the sleeve C and the second arm $d^1$ at right angles thereto. A ring $d^2$ may be let into the mouth of the arm $d$ to support a sleeve $d^3$ of non ferrous metal formed at one end with a valve seat $d^4$ and at the other end with a flange $d^5$ engaging under the end face of the ring $d^2$, sealing rings $d^6$ being provided in grooves in the end face of the ring $d^2$ and in the flange $d^5$ to ensure an airtight joint. A pipe $D^1$ is mounted on the sleeve $d^3$ by a ring nut $d^7$ screwing onto the ring $d^2$. Alternatively the sleeve $d^3$ may be mounted directly on the arm $d$.

A ferrous metal armature $A^1$ slides in the non ferrous sleeve C the armature being hollow and conical at its inner end to engage a conical surface on the plug or pole $C^2$. A coil return spring $c$ surrounds a non ferrous guide $c^1$ forming an extension of the plug $C^2$, the guide $c^1$ being formed with a central bore $c^2$ communicating with a bore $c^3$ in the armature $A^1$.

The lower end of the armature $A^1$ is provided with a bore in which is secured a ferrous cylinder $A^2$ housing a spring controlled valve $a$ adapted to close the bore $c^2$ in the guide $c^1$ when the coil A is energised. A valve $A^3$ is affixed to the cylinder $A^2$ and to the armature plunger $A^1$ by a bolt $a^1$ through a spring $a^2$, the valve $A^3$ being provided with a cap $a^3$ screwed therein and engaged by the head of the bolt $a^1$ when the spring $a^2$ has ben compressed. The bolt $a^1$ is locked in position by a grub screw $a^4$ or in other suitable manner. The valve $A^3$ is formed with a resilient face $a^5$ to engage the seat $d^4$ and is normally maintained on its seating by a spring $c$ and kept thereon by the very low pressure in the pipe line $D^1$.

The arm $d^1$ of the junction is coupled to a pipe $D^2$ connected to a vacuum pump not shown.

Figure 3:
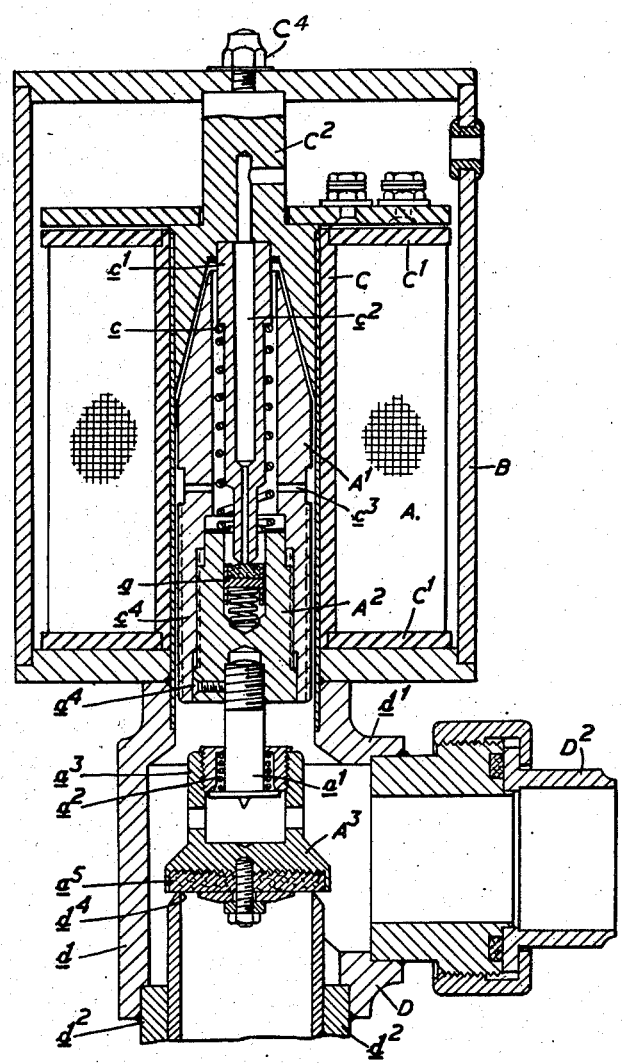
Fig. 3 is a detail section showing the valve about to open.

In operation to open the valve $A^3$ the pump is started up to reduce the pressure in the pipe line $D^2$ and the solenoid A is energised. The armature $A^1$ rises in the solenoid coil taking with it the cylinder $A^2$ the initial movement of which closes the bore $c^2$ in the pole extension or guide $c^1$; the valve $A^3$ however remains on its seat $d^4$ due to the suction in the pipe line $D^1$. The spring $a^2$ is compressed until the head of the bolt unit $a^1$ comes in contact with the lower edge of the cap $a^3$. Further movement of the armature $A^1$ now positively lifts the valve off its seat thereby giving a rapid opening and full bore through the pipe line $D^1$ and line $D^2$ and the spring $a^2$ returns it from the position shown in Fig. 3 to the relative position shown in Fig. 1 but with the valve fully open.

The force on the armature exerted by the magnetic flux due to the coil A increases as the air gap between the pole $C^2$ and the armature decreases and the movement of the head of the bolt $A^1$ is adjusted so that it engages the cap $a^3$ when the air gap is approaching a minimum so that a maximum force is available to lift the valve $A^3$ off its seat.

Figures 1, 2:
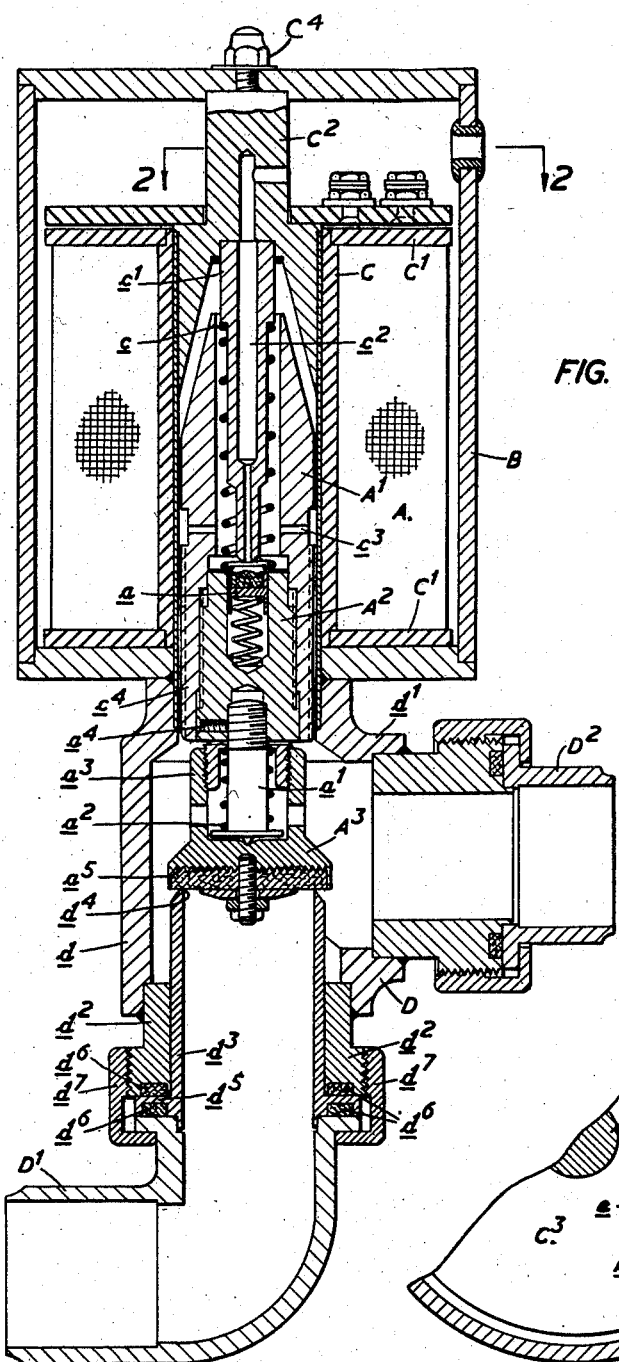
Fig. 1 is a vertical section through the solenoid and valve.
Fig. 2 is a part plan on line 2—2 Fig. 1.

On the de-energisation of the solenoid coil A the spring $c$ closes the valve $A^3$ in the line $D^1$ onto its seating in the position shown in Fig. 1 and causes the valve $a$ to move away from the mouth of the bore $c^2$ and thus places the pipe line $D^2$ in communication with atmospheric pressure through the bore $c^2$ and a transverse passage $c^3$ in the armature $A^1$ registering with longitudinal grooves $c^4$ in the periphery of the armature leading to the line $D^2$.

Where a larger pipe and bore are required than could be opened by the solenoid A without excessive excitation the valve $A^3$ may be operated in two stages the valve seating sleeve being provided with a housing for a second valve on its end remote from the seat the second valve housing being resiliently mounted on the sleeve in a similar manner to that described for the first valve whereby when the first valve opens the second valve remains initially closed until the pressures have become substantially equal when the spring loading lifts the second valve off its seating on a further sleeve in the T junction to provide a full bore through the junction. On the de-energisation of the solenoid coil A the spring closes both valves onto their seats.

The unit may be arranged at any inclination to the horizontal or vertical.

I claim:

A solenoid operated valve for high vacuum installations comprising a pipe line having a valve seat thereon, a valve element above and engageable with said seat, a solenoid coil, a ferrous pole piece extending axially into the solenoid coil, an armature reciprocable axially in the solenoid coil, said pole piece and armature having proximate ends formed with coaxial complemental conical faces which form a conical air gap between them while the armature is in de-energised position and which are relatively movable one within the other by movement of the armature in response to energisation thereof to close said air gap, an axial extension on the armature which is slidable relatively to the valve element while the latter is on said seat in response to movement of the armature in the direction to close the air gap between the armature and pole piece, an abutment on said extension, a coil spring interposed between said abutment and the valve element which balances the weight of said element, said spring being compressible into closed condition by movement of the armature in said air gap closing direction to form a solid connection between the armature and the valve element and to positively lift the valve element from the valve seat, a casing enclosing said valve element and the interior of which communicates with said pipe line, a guide fixed to said pole piece and having a bore therein which provides communication between the interior of said casing and the atmosphere while the armature is in de-energised position and said valve element is on said valve seat, and an auxiliary spring-loaded valve carried by the armature and cooperable with said guide to close the bore therein by movement of the armature in response to energisation thereof.

References Cited in the file of this patent
UNITED STATES PATENTS

| | | |
|---|---|---|
| 193,087 | Holly | July 17, 1877 |
| 962,516 | Mueller | June 28, 1910 |
| 1,523,112 | Gerald | Jan. 13, 1925 |
| 2,114,961 | Gille | Apr. 19, 1938 |
| 2,155,358 | Cyr | Apr. 18, 1939 |
| 2,292,184 | White | Aug. 4, 1942 |
| 2,360,945 | Garner | Oct. 24, 1944 |
| 2,522,249 | Baker | Sept. 12, 1950 |
| 2,596,409 | Johnson | May 13, 1952 |
| 2,609,989 | Burklin | Sept. 9, 1952 |
| 2,624,585 | Churchill | Jan. 6, 1953 |
| 2,651,744 | Acklin | Sept. 8, 1953 |
| 2,698,159 | Crum | Dec. 28, 1954 |
| 2,735,047 | Garner | Feb. 14, 1956 |

FOREIGN PATENTS

| | | |
|---|---|---|
| 566,211 | Great Britain | Dec. 19, 1944 |
| 978,073 | France | Apr. 9, 1951 |